United States Patent [19]
Weiss

[11] Patent Number: 5,132,529
[45] Date of Patent: Jul. 21, 1992

[54] FIBER-OPTIC STRAIN GAUGE WITH ATTACHED ENDS AND UNATTACHED MICROBEND SECTION

[75] Inventor: Jonathan D. Weiss, Albuquerque, N. Mex.

[73] Assignee: The United States of America as represented by the United States Department of Energy, Washington, D.C.

[21] Appl. No.: 571,358

[22] Filed: Aug. 23, 1990

[51] Int. Cl.⁵ .............................................. H01J 5/16
[52] U.S. Cl. .................................. 250/227.16; 73/800
[58] Field of Search ...................... 250/227.16, 231.19; 356/32, 35; 73/800

[56] References Cited

U.S. PATENT DOCUMENTS

| | | | |
|---|---|---|---|
| 4,163,397 | 8/1979 | Harmer | 73/800 |
| 4,191,470 | 3/1980 | Butter | 356/35.5 |
| 4,734,577 | 3/1988 | Szuchy | 73/800 |
| 4,860,586 | 8/1989 | Miers et al. | 250/227.16 |
| 4,915,473 | 4/1990 | Haese et al. | 73/800 |

OTHER PUBLICATIONS

J. Fields et al., "Fiber Optic Pressure Sensor", *Journal Acoustical Society of America*, vol. 67, No. 3, Mar. 1980, pp. 816-818.

J. Fields et al., "Fiber Microbend Acoustic Sensor", *Applied Optics*, vol. 19, No. 19, Oct. 1, 1980, pp. 3265-3267.

F. de Fornel et al., "Microbending Effects on Monomode Light Propagation in Multimode Fibers", *Journal Optic Society of America*, vol. 73, No. 5, May 1983, pp. 661-668.

*Primary Examiner*—David C. Nelms
*Attorney, Agent, or Firm*—Anne D. Daniel; James H. Chafin; William R. Moser

[57] ABSTRACT

A strain gauge is made of an optical fiber into which quasi-sinusoidal microbends have been permanently introduced. The permanent microbends cause a reduction in the fiber's optical transmission, but, when the gauge is attached to a substrate that is subsequently strained, the amplitude of the deformations will diminish and the optical transmission through the fiber will increase. An apparatus and process for manufacturing these microbends into the optical fiber through a heat-set process is employed; this apparatus and process includes a testing and calibration system.

22 Claims, 4 Drawing Sheets

FIBER-OPTIC STRAIN GAUGE WITH ATTACHED ENDS AND UNATTACHED MICROBEND SECTION

The present invention was conceived and developed in the performance of a U.S. Government Contract. The Government has rights in this invention pursuant to Contract No. DE-AC04-76DP-00789 and American Telephone & Telegraph Company.

BACKGROUND OF THE INVENTION

Optical-type strain gauges have been in use for many years. The interferometer was an early optical strain gauge that required the adoption of in-situ parallel lens systems and other in-situ comparison and/or diagnostic apparatus. This structure prevents its use for monitoring strain from a disparate location.

The advent of fiber-optics and the application of optical fiber technology to optical strain gauge structures has permitted the construction of optical strain gauges with disparate location monitoring.

Early optical fiber strain gauge technology is described by Harmer, U.S. Pat. No. 4,163,397. Harmer not only discusses microbending losses in optical fibers, but also an apparatus for measuring the change in optical propagation characteristics in a light guiding structure (glass fiber) as a function of bending, whereby strain in the object can be determined. To maintain the undulating shape of the glass fiber in the Harmer gauge, the structure incorporates a series of studs or protrusions on two separate substrates which are attached to the surface to be measured for strain. When the two substrates move toward each other under strain perpendicular to the rows of studs, the microbend amplitude increases and the optical transmission drops. This arrangement is bulky, complex, and, depending on the size of the substrates, can significantly perturb the strain being measured. Also, no provision is made for the transverse sensitivity of the Harmer gauge, that is, the response of the gauge to strain parallel to the rows of studs.

A microbend fiber-optic pressure sensor is discussed by Fields et al, *J. Acoust. Soc. Am.*, Vol. 67, No. 3, Mar. 1980; the device does not measure strain. The Fields structure uses one fiber-optic path and measures light intensity instead of optical phase shift, but requires a large, bulky, and complicated ridged pressure plate apparatus. Fields' device includes two mating ridged plates placed around a multi-mode step-index silica fiber, one end of which is illuminated by a laser and the other end monitored with a calibrated photometer. Motion is perpendicular to the axis of the fiber. A load applied to the pressure plates causes a quasi-sinusoidal distortion of the fiber. The device provides mechanically-induced amplification of light attenuation in the fiber caused by bending forces acting on the fiber; however, the size and bulkiness of the structure is simply not appropriate for a strain gauge.

Fiber-optic structures remain preferred structures for optical strain measurement from disparate locations. Butter, U.S. Pat. No. 4,191,470, shows a laser-fiber-optic interferometric strain gauge having two single-mode fibers, configured to compensate for the sensitivity of optical glass fiber structures to changes in ambient temperature. The two fibers are attached to different portions of a strainable member. It is suggested that one fiber be mounted to the top of a beam and the second be mounted to the bottom so that, in operation, one fiber is lengthened and the second is compressed. Mixing the light from each fiber will cause an interference pattern due to fringe shift which is indicative of the measure of the deflection of the beam. Butter measures the optical phase shift instead of light (intensity) amplitude. However, the measurement of the intensity of light received is less difficult than interferometric phase shift measurement.

Thus, there is an existing need for a simple fiber-optic strain gauge, which possesses the mechanical amplification of the Fields structure without the bulky and complicated ridged apparatus, and which measures the intensity of light received rather than the interferometric phase shift.

SUMMARY OF THE INVENTION

In view of the above-described need, it is an object of the present invention is to provide a simpler fiber-optic strain gauge which may be constructed in extremely small sizes and which requires no auxiliary apparatus for effective operation.

Another object of the present invention is to provide a mechanical structure integral within the fiber-optic path for optical loss whereby changes in the fiber-optic transmission due to strain are amplified.

A further object of the present invention is to provide a fiber-optic strain gauge structure which is free of transverse sensitivity.

A still further object of the present is to provide a fiber-optic strain gauge structure which measures the intensity of light received rather than the interferometric phase shift.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, there is provided a fiber-optic strain gauge including at least one optical fiber having a section containing a plurality of permanent microbends. The plural microbend section of the optical fiber is secured, typically at either end of the plural microbend section, to a beam or other structure undergoing strain and being monitored. Securing the gauge only at its ends to the surface and leaving the bends themselves completely unconstrained by any bonding agent or protective housing provides maximum longitudinal strain sensitivity and, since no strains transverse to the fiber axis can be coupled into the active section, no transverse strain sensitivity results. The latter feature is particularly desirable in a strain gauge and advantageous because it allows for an unambiguous interpretation of its output.

In accordance with another aspect of the invention, a method is provided for sensing strain in a surface undergoing strain. The optical fiber containing permanent sinusoidal deformations of sufficiently small mechanical wavelength is bonded only at its ends to a surface and stretched so that the resulting diminution in the amplitude, combined with the increase in the mechanical wavelength, of the deformations will improve the fiber's optical transmission. Since the increased transmission can be monitored, a quantitative relationship can be established between the increased transmission and the strain in the surface can be established.

A further feature of the invention is an apparatus and method for manufacturing permanent plural microbends into a section of an otherwise previously perfectly straight optical fiber. Amplitude and period of the microbends are chosen and manufactured into the optical fiber.

DESCRIPTION OF THE DRAWINGS

The accompanying drawings, which are incorporated in and form part of this specification, illustrate embodiments of the present invention and, together with the description, in which like numerals refer to like elements, serve to explain the operation, features and advantages of the present invention.

DETAILED DESCRIPTION OF THE INVENTION

Figure 1:
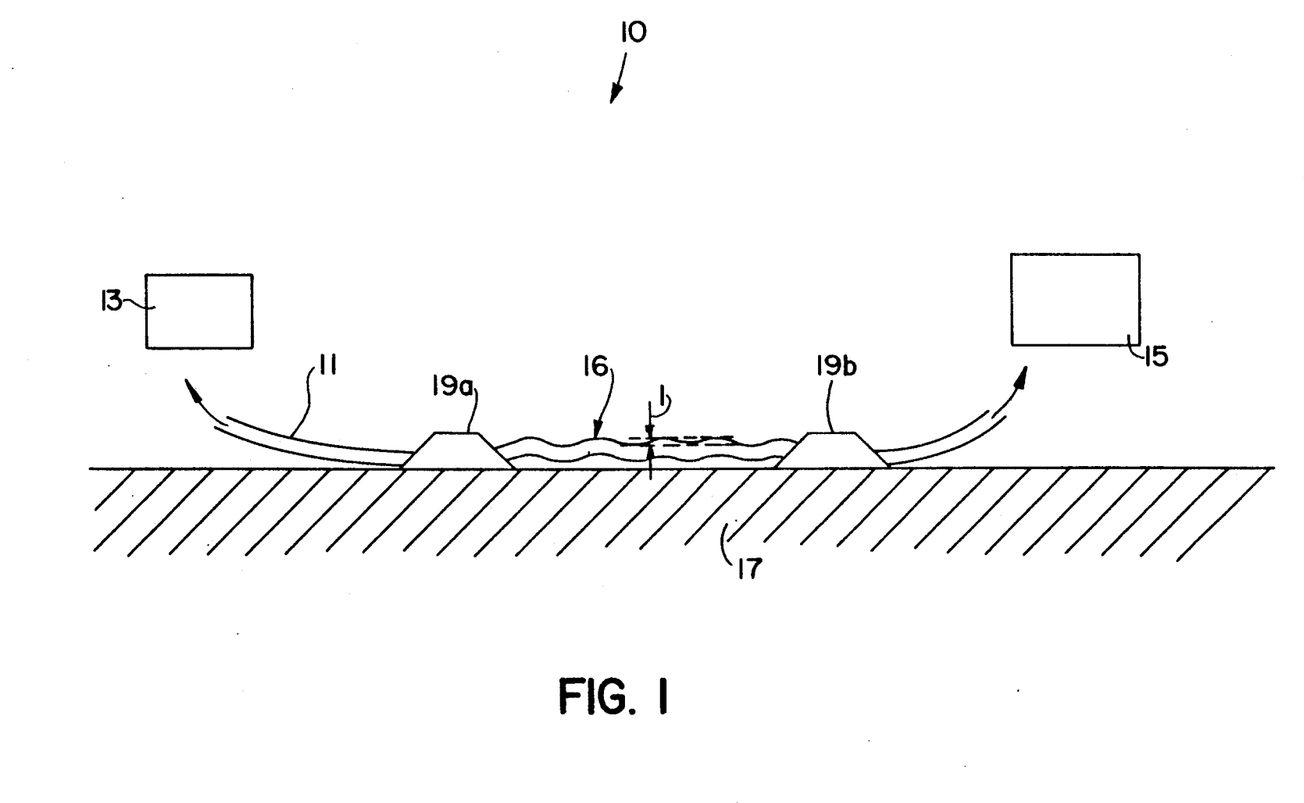
FIG. 1 is a side view of the fiber-optic strain gauge of the present invention, bonded to a surface undergoing strain.

There is shown in FIG. 1 the optical strain gauge 10 of the present invention, which is useful in making measurements even in the presence of severe electromagnetic interference. Gauge 10 is made from an optical fiber 11 coupled on one end to an optical source 13 and on its other end to an optical detector 15, although in an alternative embodiment, optical source 13 and optical detector 15 may be on the same end of optical fiber 11, whereby light may be transmitted through the fiber, reflected and detected at the same end of fiber 11.

A section 16 of the optical fiber 11 contains a plurality of microbends, that is, random or perioidic undulations in the axis of the optical fiber, which are typically small in amplitude compared to the fiber's diameter. In the preferred embodiment, they are periodic and quasi-sinusoidal. Fiber 11 is attached to a structure 17 for which the tension or compression is to be measured by the gauge 10. The attachment may be made by epoxy deposits 19a, 19b at either end of the microbend section 16.

The optical fiber used in the practice of the invention may be of any optically transmissive material. In a preferred embodiment, it is of optical quality plastic material, although optical quality commercial glass fibers or other conventional fiber may be used. Optical quality plastic material has the advantages of high ductility and low rigidity. With a Young's modulus more than twenty times smaller than that of glass, plastic fibers more closely approach the ideal strain gauge: a device having no strength at all to perturb the quantity being measured. While plastic fibers have extremely high attenuation compared to commercial grade glass, their transmission is completely adequate in the visible and near infrared light range over the short length required for the gauge and its leads (typically less than 30 cm. or 12 inches). In instances where optical source 13 and optical detector 15 are placed farther away from the microbend section 16, the plastic fiber 11 may be coupled to conventional optical fibers or glass fiber sections (not shown) for optical transmission over substantial distances.

More specifically, a type of plastic fiber that may be used in the practice of the invention has a core (diameter=240 um) and cladding (diameter=250 um) consisting of pure and fluorinated polymethyl methacrylate (PMMA), respectively, with a large numerical aperture, 0.467. The numerical aperture of an optical fiber is defined as sin $\theta$, where $\theta$ is the largest angle that an incoming light ray can make with its axis and still be guided through total internal reflection at the core/cladding interface. Alternatively, fiber 11 may be manufactured with dimensions and a numerical aperture more compatible with commercial glass fibers and with a microbend section 16 half the length of that in the preferred embodiment.

Of the physical parameters of the fiber 11, the chosen amplitude and period (distance between) of the microbends in section 16 are of particular importance in determining the sensitivity of the gauge. Amplitude herein may be defined as the peak-to-valley separation within section 16 of fiber 11, peak-to-valley being the vertical distance "1" shown in FIG. 1. In the experiments to date, amplitude has been the most variable parameter in determining the optimum strain sensitivity of gauge 10, and is generally in the range of 25 to 60 micrometers.

There are two definitions of strain sensitivity. The first, $S_o$, is $$S_o = \Delta I_o / I_o \epsilon,$$

and the second, $S_i$, is $$S_i = \Delta I_o / I_i \epsilon,$$

where $\Delta I_o$ is the strain-induced change in optical power transmitted through the gauge undergoing strain, $\epsilon$ is the value of that strain, $I_o$ is the gauge transmission at zero strain, and $I_i$ is the optical power entering the gauge. The difference between $I_i$ and $I_o$ is simply the loss introduced by the microbends. To the extent that the gauge is linear, $S_o$ and $S_i$ are independent of strain. Otherwise, they can be considered average sensitivity values over the range $\epsilon$.

Figure 2:
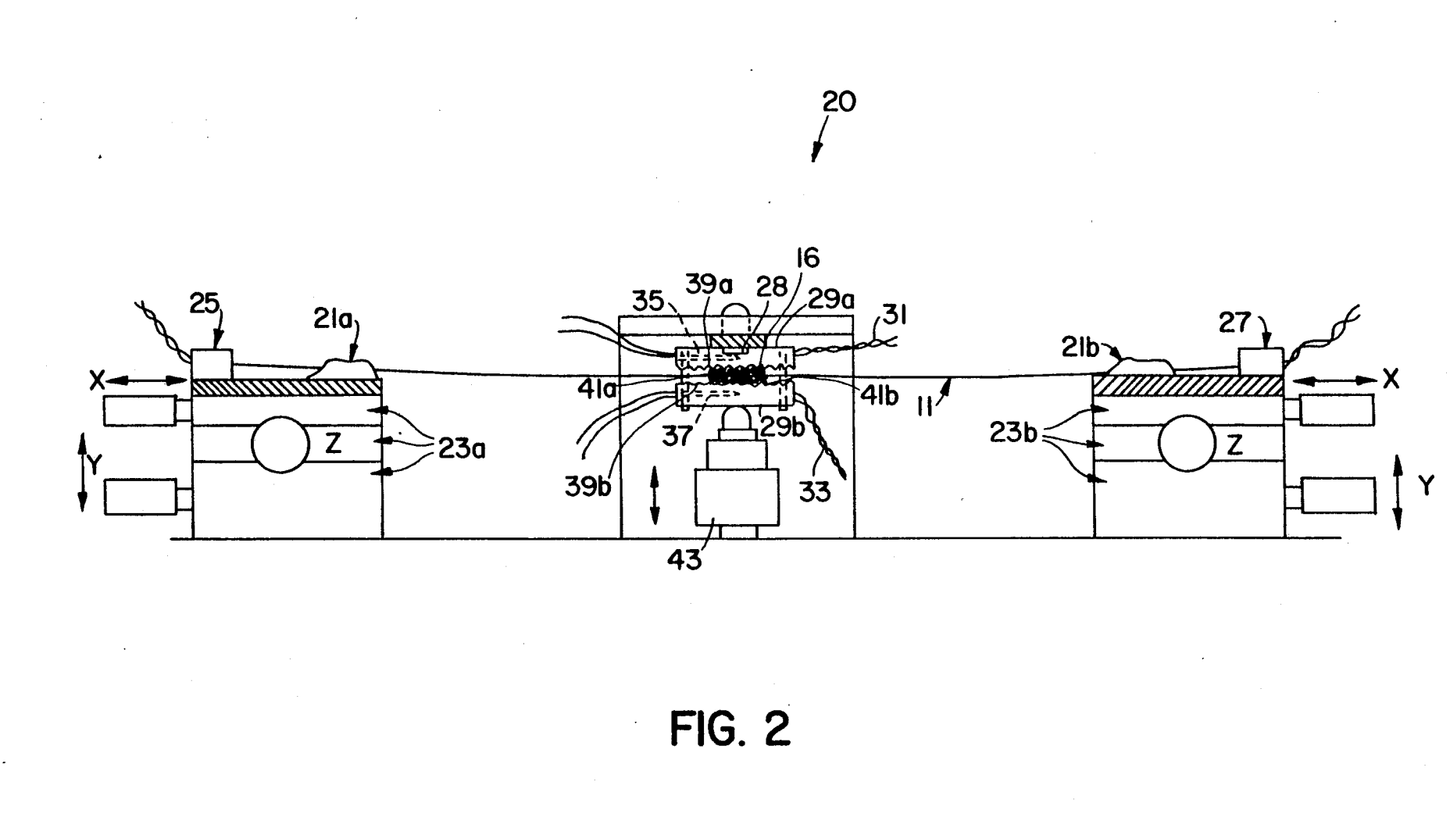
FIG. 2 is a side view of the entire apparatus for fabricating and manufacturing, and then testing and measuring, the permanent microbends in optical plastic fiber.

Assuming that the photodetector output is linear in the optical power incident upon it, the electrical strain signal detected is proportional to $\Delta I_o$. That quantity is ultimately limited by the response of the gauge to strain and the amount of light entering it. Thus, the maximum signal, for a given strain level, will be obtained for the largest value of $S_i$. Optimizing $S_o$, on the other hand, will not necessarily produce the largest strain signal because $I_o$ may be quite small as a result of the quiescent loss introduced by the microbends. However, uncertainties in fiber optic connections make it difficult to know, in practice, what optical power is entering the gauge. But it is straightforward to measure a quantity proportional to $I_o$, that is, simply the photodetector output at zero strain. Provided that the only loss mechanism that changes during strain is within the gauge itself and not in any process of connecting two fibers together or external fiber optic leads to the gauge's fiber 11 (i.e. changes due to bending in fiber 11 itself outside of the microbend section 16), the change in the detector output will also be proportional to $\Delta I_o$, with the same constant of proportionality as for $I_o$. Thus, $S_o$ can be determined unambiguously and used as the gauge calibration. This information is useful in the construction of the apparatus for manufacturing the microbends, as shown in FIG. 2, where the objective is to determine the microbend amplitude that maximizes $S_i$ and to measure $S_o$ when that occurs.

The mechanical wavelength (period) of the microbends of section 16 must be sufficiently small to efficiently convert guided modes of the optical fiber into radiation modes. In connection with microbends in highly multimode step-index fibers, the longest mechanical wavelength that will perform this function is given by $$\lambda_m = \pi a / \Delta^{\frac{1}{2}}$$

where $\lambda_m$ is the wavelength, a is the fiber radius, and $\Delta = (\frac{1}{2}n_c^2)(n_c^2 - n_{cl}^2)$, where $n_c$ and $n_{cl}$ are the core and cladding refractive index, respectively. This equation gives an approximate value for maximum allowable wavelength (period) for the coupling of core to radiation modes. The predicted value of $\lambda_m$ is 1.7 mm (0.068 inches) and may have a range generally of 1 to 2 mm, although for the purpose of testing, which is discussed later, the value actually used was 1.38 mm (0.055 inches).

A selection of equipment for the optical source 13 and the optical detector 15 is not critical. Any optical source having a wavelength within the transmission limits of the plastic fiber (basically, the visible and near-infrared) and having radiation that can be conveniently coupled into the fiber, can be used to illuminate the gauge. Optical source 13 may be coherent or incoherent and may be implemented with a helium/neon laser. More specifically, a light-emitting diode (LED) which is, by design, suited to optical fibers and emits radiation in the 820 micrometer range may be used as the source 13 for the gauge 10.

Optical detector 15 must be calibrated and is preferably linear in the optical power incident upon it. It may be implemented with a calibrated photometer; more specifically, a p-i-n diode may be used as a detector 15.

The basic operation of the invention is now apparent. In accordance with the invention, strain gauge 10 is mounted in a state of residual tension and moves with the movement of structure 17. As the structure 17 moves, the two epoxy deposits 19a, 19b move with respect to one another, either closer or farther apart, and thereby either compress the microbend section 16 or stretch its length. Motion of the structure, and thus the gauge, is along the axis of the fiber. In the act of moving, the "amplitude" and "period" of the microbends of the section 16 change. Variations in detected light intensity caused by changes in microbend section 16 are indicative of strain in said surface.

Strain sensitivity occurs as a function of microbend amplitude. If the surface 17 is under tension, so is the optical fiber 11. When under tensional forces (strain), the microbends will partially straighten thereby reducing optical transmission losses and increasing optical transmission efficiency. In other words, where the microbend section 16 is stretched and the bends unfold or flatten, the optical losses through the section 16 decrease. Conversely, if the surface 17 is under compression, so is the optical fiber 11, such that the amplitude of the microbends increase as do the optical transmission losses through the microbend section 16 of the optical fiber 11. In other words, where the microbend section 16 is compressed and the bends accentuate, optical losses through the section 16 increase. The amplitude and period of the microbends in conjunction with the wavelength of the light passed through the optical fiber 11 establishes the nominal or "base" light attenuation through the microbend section.

The fiber-optic gauge 10 of the present invention is bonded only at its ends 19a, 19b to a surface 17 undergoing strain. Leaving the microbend section 16 completely unconstrained by any bonding agent or protective housing provides two advantages for the invention: it results in maximum longitudinal-strain sensitivity; and, since no strains transverse to the fiber axis can be coupled into its active section, it results in zero transverse-strain sensitivity. The latter feature is desirable in a strain gauge because it allows for an unambiguous interpretation of its output.

A prototype of the fiber-optic gauge 10 that has been tested for performance employed a fiber 11 having a core, or transmission wave guide, diameter of 240 micrometers, a length of less than 30 cm (12 inches), and a microbend section 16 length of about 19 mm ($\frac{3}{4}$ inches). Equally good results have been obtained with a microbend section 16 $\frac{3}{8}$ inches in length. Fiber 11 included a cladding with an outside diameter of 250 micrometers. The wave length (period) designed into the prototype gauge 10 was about 1.38 mm (0.055 inches). For the above-recited parameters, the maximum strains sensitivity of microbend section 16 of optical fiber 11 occurred at a microbend amplitude of about 38 micrometers (0.0015 inches).

Since commercial optical fibers are manufactured straight and defect-free, construction of the strain gauge 10 of the present invention requires the introduction of the microbend section 16 in a separate manufacturing process. In accordance with the invention, there is provided an apparatus and method for fabricating microbend section 16 of fiber 11 of gauge 10 and for testing and calibrating the strain sensitivity of gauge 10 itself. FIG. 2 shows apparatus 20 for manufacturing the microbend section 16 of the optical fiber 11 and for testing gauge 10, and FIG. 3 is a detail view of compression fixture 28 that is part of apparatus 20.

Figure 3:
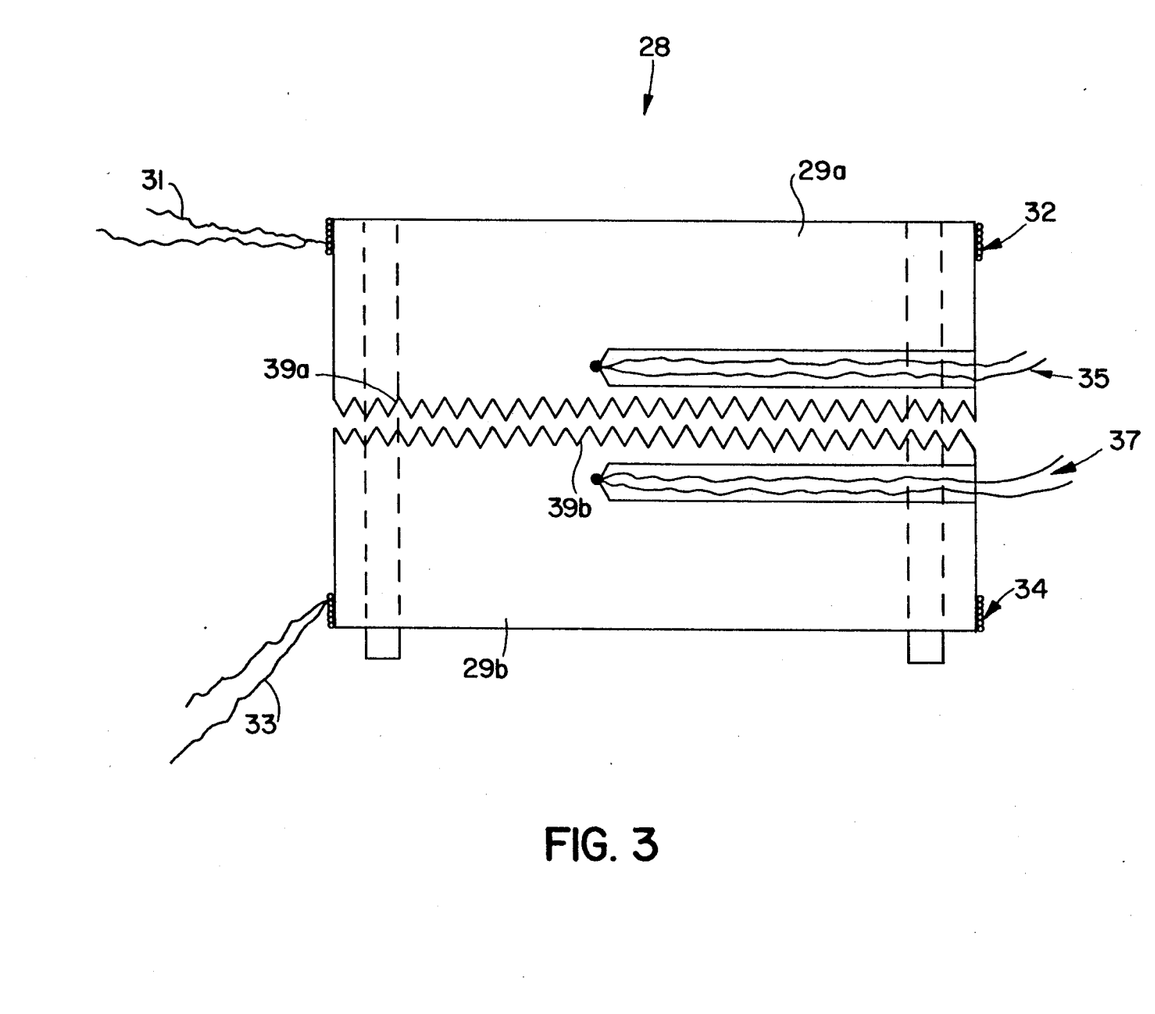
FIG. 3 is a detail view of the compression fixture for producing permanent microbends in the optical plastic fiber, as shown in place in FIG. 2.

For microbends to be made permanent, the fiber 11 must be heated to its softening point and then cooled under compression in fixture 28 of FIG. 3. Because of the high softening point of glass fibers (on the order of 1,000 degrees centigrade, depending upon their purity) and their brittle character, it is vastly easier to work with plastic fibers which have the advantages of lower softening point and greater ductility, as previously discussed.

Before introducing the microbends into the fiber 11, their amplitude and mechanical wavelength (distance between bends or period) must be chosen, as well as the formation temperature and the length of time the fiber is to be held at that temperature. Amplitude and mechanical wavelength are chosen in accordance with the standards previously discussed herein, i.e. the microbend amplitude that maximizes strain sensitivity in the gauge is determined. As to temperature and time, holding the fibers under compression for 1½ hours at 80 degrees centigrade will produce the desired microbends, although shorter times and/or higher temperatures may work equally well.

In addition to the wavelength, time and temperature, the length of microbend section 16 is chosen. Typically, as previously discussed, the length of microbend section 16 is fixed at 19 mm (0.75 inches). As also previously discussed, a length of ⅜-⅞ inches is reasonable for a strain gauge.

In apparatus 20, the plastic optical fiber 11 is epoxied at respective points 21a, 21b to individual, three-directional, positioning structures 23a and 23b, situated an adjustable distance "d" apart. Distance "d" is, typically, approximately 9 inches. The positioning structures 23a, 23b are each adjustable in the x-, y-, and z-directions. Carried on the first structure 23a is a LED optical source 25 coupled to a first end of the plastic (formable) optical fiber 11. Coupled to the other end of the plastic optical fiber 11 is a p-i-n diode optical detector 27.

Before impressing the microbend section 16 into the straight fiber 11, the output of the detector 27 is noted. Ignoring any bulk attenuation of the fiber over its length "d", this quantity is proportional to $I_i$. The straight fiber 11 is then pulled in order to observe any "baseline" strain signal. That signal is later used as a correction to the one measured after microbend section 16 is introduced. If necessary, correction of contributions to background strain signal resulting from the emergence of the fiber from epoxy pads 21a, 21b nonparallel to the direction of strain is made by adjustment of positioners 23a and 23b in the y- and z-directions. In testing a prototype of this apparatus, which will be discussed further herein, in every case, it was possible to reduce the strain response of the straight fiber to 1 percent or less of that resulting from the introduction of the microbends.

To form the microbends, optical fiber 11 passes through a pair of juxtaposed forming plates 29a, 29b which are electrically heated by electrical resistance wires 31, 33. Each forming plate 29a, 29b has an internal thermocouple 35, 37 for sensing and regulating the temperature of the respective forming plates 29a, 29b. Each juxtaposed face of the forming plates 29a, 29b carries a plurality of forming ridges 39a and 39b, respectively, that mate or interlace when the faces are in contact or compressed. Positioned between optical fiber 11 and each of the forming ridges 39a and 39b, are sheets or layers of mylar material 41a and 41b (not shown in FIG. 3). This mylar material 41a and 41b prevents the "teeth" of forming ridges 39a and 39b from cutting into deformed section 16 and prevents forming ridges 39a and 39b from contacting that portion of the fiber 11 extending beyond the mylar material 41a and 41b for deformation amplitudes no greater than the mylar thickness.

A mechanical, spring-loaded ram and screw method micro-positioner 43 (not shown in FIG. 3) moves the lower forming plate 29b against the fixedly positioned, upper forming plate 29a, until plate 29b begins to compress the fiber, at which point a reading is made on the micrometer (not shown) that controls this vertical motion. The onset of compression is determined by monitoring the optical throughput of the fiber 11. As soon as compression occurs, the throughput begins to drop. Sudden changes in transmission as small as 1 part in 10,000 may be resolved, resulting in an uncertainty in the point of contact no greater than about 2.54 um (0.0001 inches). However, larger variations in detector voltage, for instance, from the effect of ambient temperature fluctuations on the source, detector, and fiber, may occur over a much longer time period.

Heat is then applied to the fiber by means of heater coils (not shown in FIG. 2) on either half of the fixture, resulting in a rise to the steady-state temperature of 80° C. in about 10 minutes. In some instances, forming plates 29a, 29b, may be held in this position for about 90 minutes and at a temperature of 80 degrees centigrade. The fiber temperature is assumed to be the average temperature indicated by thermocouples 35, 37, and is controlled to within 2° C. throughout the heating period. After heating, the fiber remains under compression until it cools to room temperature at which time microbend section 16 is permanently heat-set in fiber 11. Forming plates 29a and 29b are then separated from the now permanently microbent fiber, in preparation for transmission measurements under varying levels of tension. After the microbends are formed, strain sensitivity in the fiber is measured at the microbend amplitude that maximizes that sensitivity and at any other microbend amplitude to determine potential gauge performance.

A prototype of apparatus 20 has been built and tested for performance. In the prototype, referring to FIG. 2, a straight fiber 11 was connected to optical source 25 (a surface-emitting Motorola L.E.D. producing a peak wavelength of 815 nm and a full spectral bandwidth of 50 nm at the half-power points) and a detector 27 (a p-i-n diode). The optical fiber 11 was epoxied near each end (at 21a and 21b) onto precision three-directional, optical translators or positioners 23a and 23b; the purpose of translators 23a, 23b is to control tension in the fiber 11 when the translator is moved outward in the x-direction (i.e. parallel to the fiber). Since source 25 and detector 27 were also secured to their respective translators or positioners 23a and 23b, all fiber strain occurred in the length between the epoxy pads 21a and 21b. Thus, the connections to source 25 and detector 27 were unperturbed during the straining process and should be eliminated as a contribution to the strain-induced signal. With this arrangement, over the time of the measurement, ambient temperature fluctuations produced negligible changes in the fiber 11 transmission compared to the change in transmission caused by strain.

For the purpose of the testing of the prototype, the wavelength used, referring to the point-to-point separation shown in FIG. 2, was again 1.38 mm (0.055 inches), and the length of micrbent section 16 was again fixed at 19 mm (0.75 inches).

After formation of the microbend section 16, the gauge was calibrated and tested for its strain sensitivity. Calibration is accomplished by determining the variation of transmitted light amplitude as a function of strain. Tension in the fiber 11 was increased with one horizontal positioner and decreased with the other, in order to avoid introducing unnecessary hysteresis into the measurement of fiber transmission as a function of strain. Optical transmission of the fiber 11 under each of the tension levels is measured.

Given their three-directionality, the positioners could also have been for lateral alignment. The peak strain developed in the fiber 11 was chosen to be $4 \times 10^{-3}$ for this testing, although higher strains can be produced. In addition, for a fiber length of about 9 inches between the positioners, strains as small as $5 \times 10^{-6}$ could be resolved by a direct reading of the movement of the horizontal positioner. However, the strain in the microbend section 16 of fiber 11 was not exactly equal to the length change divided by the original length, e.g. 9 inches, because its Young's modulus was slightly smaller than that of an unperturbed fiber of the same material. This reduction in rigidity occurred because the unfolding of the corrugations under tension contributes to the length change, in addition to the stretching of the bulk material. The correction to the strain was readily calculable and, though small for the microbend amplitudes used for this testing, it was included in the final determination of $S_i$ and $S_o$.

From the onset of tension, the change in micrometer reading was directly proportional to strain, and the strain response of the gauge was typically linear.

In summary, the fiber-optic gauge 10, with microbend section 16 created by apparatus 20, is more practical for a strain gauge than previous glass fiber gauges with induced bends. It is generally more sensitive than metallic foil strain gauges and is comparable in sensitivity to many semiconductor strain gauges and is free of electromagnetic interference. It has good linearity over the range of strain of at least $7 \times 10^{-3}$ and responds to strain in only one direction. Moreover, it is mechanically weak enough to be considered minimally intrusive and is optically and electronically simple in structure.

Since strain can result from many mechanical processes, gauge 10 can also be used as a core element in various kinds of instrumentation, such as a vibration sensor and an accelerometer.

When used as a vibration sensor, the configuration is the same as that shown in FIG. 1; however, in a vibration sensor, the structure 17 of FIG. 1 does not stretch in the direction of the fiber 11, but as a whole undergoes either vertical vibrations or horizontal vibrations perpendicular to the axial length or direction of the gauge. This motion induces the optical fiber 11 to vibrate, like a guitar string, in the same direction. Depending on the length and initial tension in fiber 11, the average strain over its length created by this motion is a sensitive function of the amplitude and frequency of vibration. Once calibrated, a determination of amplitude and frequency can be made from the gauge's output.

Figure 4A:
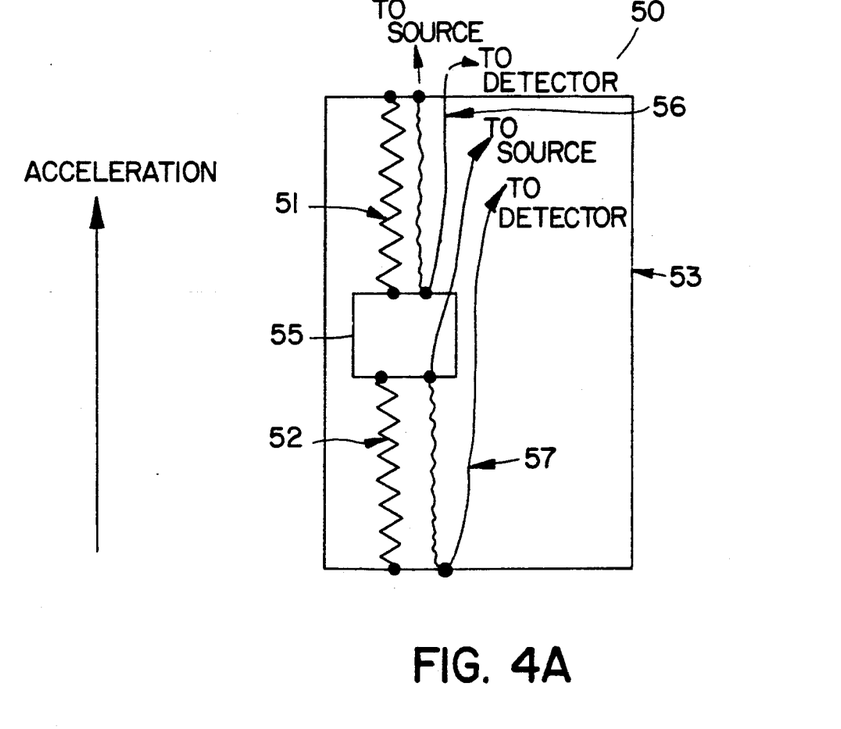
FIG. 4A is side view of the fiber-optic strain gauge of the present invention in a basic accelerometer structure.
Figure 4B:
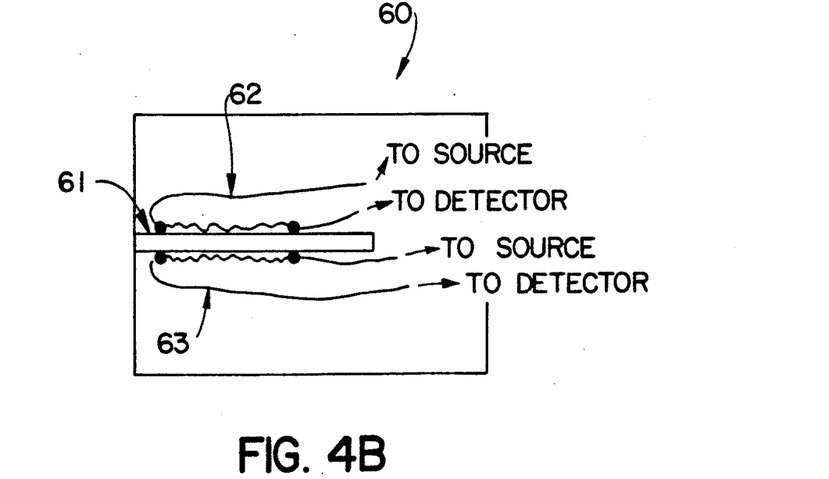
FIG. 4B is a side view of another configuration of an accelerometer structure including a cantilevered beam with a fiber-optic strain gauge according to the present invention mounted on either side.

Acceleration can also induce strain, as illustrated in FIGS. 4a and 4b. FIG. 4a shows a basic accelerometer structure 50, consisting of two springs 51 and 52 attached at one end to a mass 55 and at the other end to the housing 53 of the accelerometer 50. Some form of damping (not shown), either viscous or magnetic, is also required. Under acceleration along the indicated direction, springs 51 and 52 alternately stretch or compress, i.e. one of springs 51 or 52 stretches while the other compresses. Each change in length of springs 51 and 52 is measured by separate fiber-optic strain gauges 56 and 57, each of which are bonded at one end to mass 55 and at the other end to opposite ends of the housing. The fiber-optic strain signals produced by gauges 56 and 57 are of opposite sign within this configuration; however, production of electrical output proportional to the difference in the optical signals incident on attached detectors (not shown) is accomplished by electronic circuitry (not shown). The resulting product is twice the output customarily produced from either gauge 56 or 57 alone, and any undesired common mode signal, such as that caused by uniform temperature variations within the accelerometer, is suppressed, where suppression may go to complete cancellation.

Another configuration for an accelerometer is shown in FIG. 4b. Accelerometer 60 includes a cantilevered beam 61 with fiber-optic strain gauges 62 and 63 mounted on either side. Under acceleration, the beam 61 deflects, resulting in compression on one side and extension on the other. As described above, the fiber-optic strain signals produced by gauges 62 and 63 are of opposite sign within this configuration, but production of electrical output proportional to the difference in the optical signals incident on attached detectors (not shown) is accomplished by electronic circuitry (not shown), resulting in a product that is twice the output of either gauge 62 or 63 alone together with suppression to cancellation of any undesired common mode signal.

Thus, according to the invention as depicted in FIGS. 4a and 4b, desired strain signals, i.e. those of acceleration, would be enhanced and undesired or confusing signals would be suppressed.

The foregoing description of the invention has been presented for purposes of illustration. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the invention be defined by the claims appended hereto.

What is claimed is:

1. An optical fiber strain gauge for measuring strain in a structure, comprising:
    a length of optical fiber having a microbend section defined by at least one microbend permanently formed in said section;
    means for attaching at least one end of said microbend section of said fiber to the surface of the structure; and a means for measuring changes in said microbend section not attached to said substrate caused by strain in the structure.

2. The strain gauge of claim 1, further comprising means for attaching said optical fiber to a surface of said structure only at each end of said microbend section.

3. The strain gauge of claim 2, further comprising an optical light source means for transmitting optical light into said fiber.

4. The strain gauge of claim 3, further comprising optical detector means for detecting light transmitted through said fiber, whereby variations in detected light intensity caused by changes in said microbend section are indicative of strain in said surface.

5. The strain gauge of claim 1, comprising:
    a length of optical fiber having a microbend section defined by a multiplicity of microbends permanently formed in said section.

6. The strain gauge of claim 5, further comprising means for attaching said optical fiber to a surface of said structure only at each end of said microbend section.

7. An optical fiber strain gauge for measuring strain in a structure, comprising:
    (a) a length of optical fiber having a microbend section defined by a multiplicity of quasi-sinusoidal microbends permanently formed in said section at a position between each end of said optical fiber;

(b) means for attaching said optical fiber to a surface of said structure only at each end of said quasi-sinusoidal microbend section;

(c) optical light source means for transmitting optical light into said fiber;

(d) optical detector means for detecting light transmitted through said fiber, whereby variations in detected light intensity caused by changes in said quasi-sinusoidal microbend section are indicative of strain in said surface.

8. The strain gauge of claim 7, wherein said optical fiber is comprised of an optically transmissive material.

9. The strain gauge of claim 7, wherein said optical fiber is comprised of plastic material.

10. The strain gauge of claim 9, wherein said optical fiber is comprised of polymethyl methacrylate material.

11. The strain gauge of claim 9, wherein said optical fiber is clad with fluorinated polymethyl methacrylate material.

12. The strain gauge of claim 7, wherein said optical fiber is comprised of glass material.

13. The strain gauge of claim 7, wherein said optical light source produces visible and near-infrared light.

14. The strain gauge of claim 13 wherein said light from said optical light source is approximately in the 820 micrometer range.

15. The strain gauge of claim 7, wherein said microbends of said microbend section have a (period) distance between bends in the range of about 1 to 2 mm and a peak to valley amplitude in the range of about 25 to 60 micrometers.

16. The strain gauge of claim 15, wherein said optical fiber is about 240 micrometers in diameter with about 5 micrometers thickness of a cladding layer, and said microbend section of said optical fiber is about 2.0 cm in length.

17. The strain gauge of claim 7 wherein said optical detector includes a p-i-n diode connected to the end of said optical fiber.

18. A method of measuring strain using a length of optical fiber having a microbend section defined by at least one microbend permanently formed in said section, comprising:

(a) attaching said fiber to a device in which strain is to be measured, said attachment being only at the ends of said microbend section; and (b) measuring the change of light transmitted through said fiber.

19. A method for measuring strain in a structure as in claim 18 whereby said optical fiber vibrates in the direction of vibration of the structure to which said fiber is attached and further comprising: c) measuring variations in detected light intensity caused by changes in said microbend section resulting from displacement of said surface wherein said variations are indicative of amplitude and frequency of vibration in said surface.

20. An optical fiber strain gauge for measuring acceleration in an accelerometer having a housing and a movable mass, comprising:

(a) at least two lengths of optical fiber, each having a microbend section defined by at least one microbend permanently formed in said section, and each connected at one end to a fixed point on said housing and at the other end thereof to opposite sides of said movable mass;

(b) means for attaching each of said fibers between said mass and said housing of said accelerometer, said attaching means being only at each end of said microbend sections of said fibers, respectively;

(c) an optical light source means for transmitting optical light into said fibers;

(d) at least two optical detector means for detecting light transmitted through each of said fibers, whereby change in strain due to acceleration in one of said fibers is mirrored by an equal and opposite change in the other, such that desired product is doubled and undesired common mode signal is suppressed.

21. An optical fiber strain gauge for measuring acceleration in an accelerometer, according to claim 20, wherein said accelerometer includes at least two springs, each spring being connected at one end to a fixed point on said housing and at the other end thereof to opposite sides of said movable mass and being in a parallel position to each of said fibers, whereby, under acceleration in the direction of the longitudinal axes of said optical fibers, said springs alternately stretch or compress and the change in strain in one fiber caused by the stretching and or compression is mirrored by an equal and opposite change in the other, such that desired product is doubled and undesired common mode signal is suppressed.

22. An optical fiber strain gauge for measuring acceleration in an accelerometer, according to claim 20, wherein said movable mass is a cantilevered beam and said attaching means includes attaching each of said fibers to an opposite side of said cantilevered beam such that deflection of said beam results in compression of said fiber on one side of said beam simultaneously with extension of said fiber on the other side, said compression and extension being measured and reproduced in fiber optic strain signals of opposite sign, such that desired product is doubled and undesired common mode signal is suppressed.

* * * * *